United States Patent

Hasegawa et al.

Patent Number: 6,117,370
Date of Patent: Sep. 12, 2000

[54] NEAR INFRARED ABSORPTION FILTER

[75] Inventors: Shun Hasegawa; Gen Masuda, both of Tokyo, Japan

[73] Assignee: Nisshinbo Industries, Inc., Tokyo, Japan

[21] Appl. No.: 09/437,664

[22] Filed: Nov. 10, 1999

[30] Foreign Application Priority Data

Nov. 11, 1998 [JP] Japan .................. 10-321054

[51] Int. Cl.$^7$ .................. F21V 9/04; G02B 5/22
[52] U.S. Cl. .................. 252/587; 359/885; 313/479
[58] Field of Search .................. 252/587; 359/885; 313/479

[56] References Cited

U.S. PATENT DOCUMENTS

| | | | |
|---|---|---|---|
| 3,557,012 | 1/1971 | Tucker | 252/587 |
| 3,637,769 | 1/1972 | Susi | 252/587 |
| 3,709,830 | 1/1973 | Susi | 252/587 |
| 3,875,199 | 4/1975 | Bloom | 252/587 |
| 4,921,317 | 5/1990 | Suzuki et al. | 252/587 |
| 5,248,584 | 9/1993 | Miura | 430/270 |
| 5,336,584 | 8/1994 | Yanagisawa et al. | 430/273 |
| 5,436,113 | 7/1995 | Tsuji et al. | 430/275 |
| 5,482,822 | 1/1996 | Mihara et al. | 252/587 |
| 5,804,102 | 9/1998 | Oi et al. | 252/587 |

FOREIGN PATENT DOCUMENTS 2-264788  10/1990  Japan .

*Primary Examiner*—Philip Tucker
*Attorney, Agent, or Firm*—Kubovcik & Kubovcik

[57] ABSTRACT

The present invention provides a near infrared absorption filter which contains, in a resin film produced from either or both a polycarbonate and a polyarylate by solution casting, a dithiol-nickel complex represented by the following formula (1):

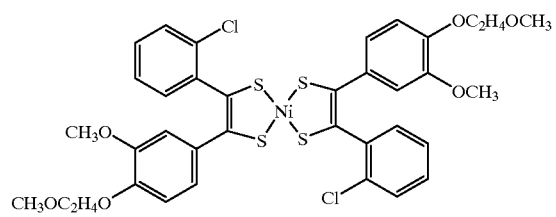

(1)

and at least one kind of diimmonium compound represented by the following formula (2):

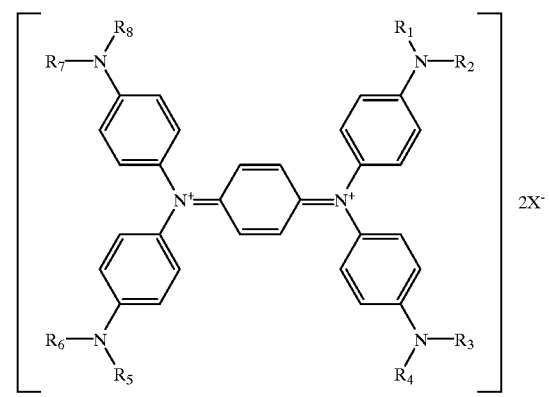

(2)

(Wherein $R_1$ to $R_8$ may be the same or different and are each a hydrogen atom, an alkyl group or an aryl group; and $X^-$ is an anion represented by halogen anion, perchloric acid anion, antimony hexafluoride anion or nitric acid anion).

8 Claims, 5 Drawing Sheets

NEAR INFRARED ABSORPTION FILTER

BACKGROUND OF THE INVENTION (1) Field of the Invention

The present invention relates to a near infrared absorption filter. More particularly, the present invention relates to a near infrared absorption filter which is suitably used particularly as a near infrared filter for a plasma display panel by combining with a layer having a different function.

(2) Description of the Prior Art

In recent years, large displays of various types have been developed and commercialized. A plasma display is one of such displays. A plasma display generates a near infrared light during the plasma discharge, as easily understood from the operational mechanism; and since remote control systems of household electronic appliances (such as a TV, air-conditioner, video tape recorder, etc.) use the same or similar wavelength of the near infrared region, a plasma display may cause false functioning of those appliances placed nearby.

Hence, it was proposed to utilize a near infrared absorption filter which can absorb and shield a light of the near infrared region, i.e. 800 to 1,000 nm, particularly 850 to 1,000 nm. As such a near infrared absorption filter, there can be mentioned, for example, (1) a filter made of a phosphate glass containing a metal ion (e.g. bivalent copper ion), (2) a filter obtained by forming, on a substrate (e.g. a glass), a thin layer of metal (e.g. silver) by vapor deposition, sputtering, ion-plating or any other methods, (3) a filter made of a phosphoric acid group-containing acrylic resin containing a metal ion (e.g. bivalent copper ion), and (4) a filter obtained by adding, to a resin, a dye capable of absorbing a light of the near infrared region.

The above near infrared absorption filters, however, have respective problems. The filter (1) made of a phosphate glass containing a metal ion is hygroscopic and employs a complicated production process. The filter (2) obtained by forming, on a substrate (e.g. a glass), a thin layer of metal (e.g. silver) by vapor deposition, ion-plating or any other methods, has the problem of reflecting not only the light of the near infrared region but of the visible region although its amount is smaller than that in near infrared region. And also it lowers its transmittance when it is too thick, and has a high production cost as well. In the filters (1) and (2), a glass is used in most cases; therefore, the filters are heavy, crack easily, and are difficult to mold.

For the filter (3) made of a phosphoric acid group-containing acrylic resin containing a metal ion, complexity of the production process, etc. is pointed out.

In contrast, the filter (4) obtained by adding, to a resin, a dye capable of absorbing a light of the near infrared region has various advantages such as light weight as compared with glass-made filters and easy production. However, the filter (4) has the following problems.

That is, many of the dyes capable of absorbing a light of the near infrared region show absorption also in a visible light region. Therefore, the filter (4) containing such a dye may possibly show absorption also in a visible light region other than the near infrared region, which is not preferred.

Further, many of the dyes capable of absorbing in the near infrared region, particularly many of the diimmonium compounds are inferior in heat resistance and heat stability; therefore, a near infrared absorption filter containing such a dye, produced, for example, by incorporation of the dye, often contains a heat decomposition product of incorporated dye. This heat decomposition product, unlike the incorporated dye per se, absorbs substantially no near infrared region but absorbs a visible light region. As a result, in the filter, the absorption of the near infrared region is relatively low as compared with the absorption of the visible light region, and the transmission in the visible light region becomes low.

Furthermore, the dyes capable of absorbing in the near infrared region, particularly the diimmonium compounds deteriorate faster when used in combination with other dyes. Therefore, in determining the dyes to be used in a near infrared absorption filter, it is necessary that they are selected so as to have no interaction with each other or they are used in a plurality of layers each containing a different dye.

SUMMARY OF THE INVENTION

The present invention aims at alleviating the above-mentioned problems of the prior art and providing a near infrared absorption filter which has excellent heat resistance, shows stable absorption over a long period of time, has a high transmittance for visible light and high absorption for near infrared light, and is suitably used particularly as a near infrared absorption filter for a plasma display panel.

According to the present invention, there is provided a near infrared absorption filter which contains, in a resin film produced from either or both of a polycarbonate and a polyarylate by solution casting, a dithiol-nickel complex represented by the following formula (1):

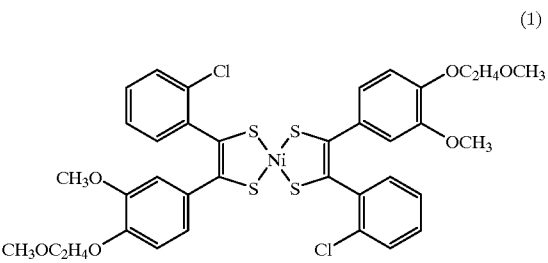

(1)

and at least one kind of diimmonium compound represented by the following formula (2):

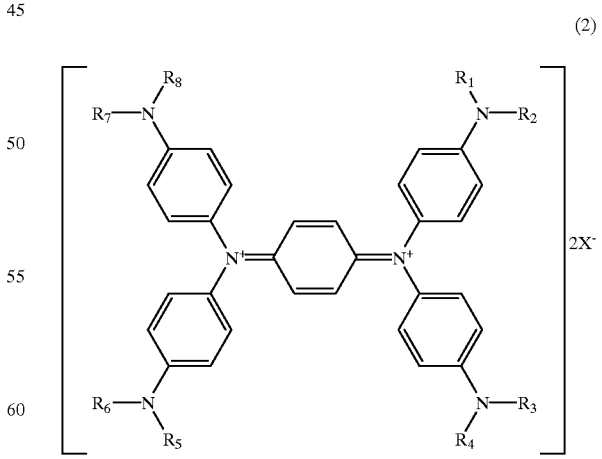

(2)

(wherein $R_1$ to $R_8$ may be the same or different and are each a hydrogen atom, an alkyl group or an aryl group; and X– is an anion represented by halogen anion, perchloric acid anion, antimony hexafluoride anion or nitric acid anion).

DETAILED DESCRIPTION OF THE INVENTION

Figure 1:
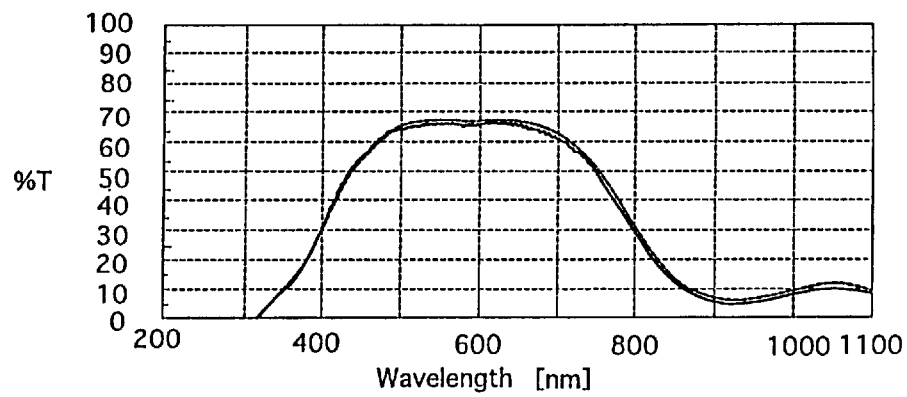
FIG. 1 is an absorption spectrum of the film (near infrared absorption filter) obtained in Example 1.

The present invention is described in detail below.

The near infrared absorption filter of the present invention is representatively a near infrared absorption filter which contains (i.e., is obtained by adding) a particular dithiol-nickel complex and at least one kind of particular diimmonium compound, in (to) a resin film produced from either or both of a polycarbonate and a polyarylate by solution casting. The polycarbonate used for production of the above resin film has a number-average molecular weight of, for example, 10,000 to 30,000; and the polyarylate has a number-average molecular weight of, for example, 18,000 to 30,000.

Which of the polycarbonate and the polyarylate should be used, or in what compounding ratio the polycarbonate and the polyarylate should be used when they are used in combination, may be determined depending upon the application form or application method of the near infrared absorption filter to be obtained. For example, when the near infrared absorption filter to be obtained is required to have impact resistance and visible light transmittance, use of the polycarbonate is preferred. When the near infrared absorption filter to be obtained is required to have surface hardness and ultraviolet absorption, use of the polyarylate is preferred.

When the near infrared absorption filter to be obtained is required to have the above-mentioned properties in good balance, the polycarbonate and the polyarylate can be used in combination. The compounding ratio of the two polymers is preferred to be, for example, polyarylate/polycarbonate= 3/7 to 9/1 (weight ratio).

The dithiol-nickel complex used in the present invention represented by the above formula (1); shows, in the resin film used in the present invention, the maximum absorption for a wavelength of 900 nm; gives an absorption wave curve which is approximately symmetrical to the maximum absorption wave-length; and can effectively conduct by itself the shielding of a near infrared region of 850 to 1,000 nm which is necessary when the present filter is used particularly for a plasma display panel.

In the present invention, the amount of the dithiol-nickel complex added to the resin film is determined depending upon the thickness and absorption required for the present near infrared absorption filter. When the amount of absorbance is fixed and the near infrared absorption filter is thin, it is necessary to add the dithiol-nickel complex in a large amount; when the near infrared absorption filter is thick, the amount of the dithiol-nickel complex added may be small.

The specific amount of the dithiol-nickel complex added can be, for example, 1 to 800 mg (800 mg is close to the saturation concentration of the dithiol-nickel complex in the later-described solution used in production of the present near infrared absorption filter) per the unit area (i.e. 1 m$^2$) of the present near infrared absorption filter, preferably 5 to 500 mg per 1 m$^2$, more preferably 30 to 300 mg per 1 m$^2$.

When the amount of the dithiol-nickel complex added is smaller than the above range, no desired absorption may be obtained. When the amount is too large, the transmittance for visible light may be low and insufficient.

The diimmonium compound used in the present invention is represented by the following formula (2):

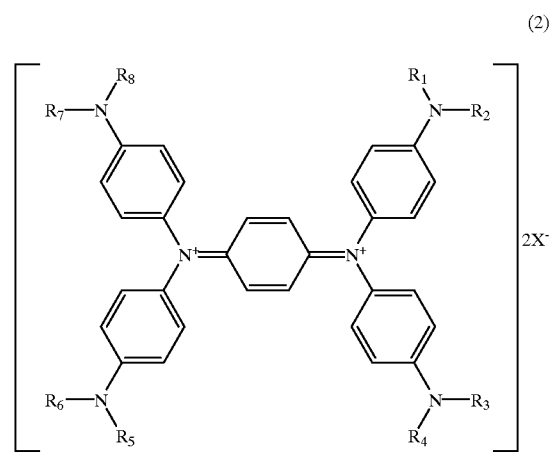

(2)

(wherein $R_1$ to $R_8$ may be the same or different and are each a hydrogen atom, an alkyl group or an aryl group; and X– is an anion represented by halogen anion, perchloric acid anion, antimony hexafluoride anion or nitric acid anion). Preferably, $R_1$ to $R_8$ may be the same or different and are each a hydrogen atom or an alkyl group having 1–8 carbon atoms.

A diimmonium compound of the formula (2) wherein $R_1$ to $R_8$ are each an alkyl group, is preferred because it shows very small absorbance in the visible light region, is highly soluble in solvents and can achieve a high dye concentration, and can decrease the thickness of resin film. Examples of such a compound are as follows.

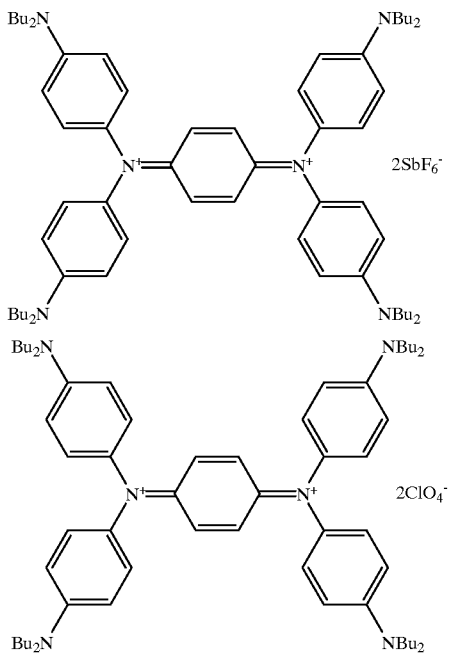

The amount of the diimmonium compound of formula (2) added can be, for example, 1 to 800 mg per the unit area (i.e. 1 m$^2$) of the present near infrared absorption filter, preferably 5 to 500 mg, more preferably 30 to 300 mg.

When the amount of the diimmonium compound added is smaller than the above range, no desired absorption may be obtained. When the amount is larger than the above range, the transmittance for visible light may be low and insufficient. Therefore, none of such amounts is preferred.

When the compounding ratio of the dithiol-nickel complex represented by the formula (1) and the diimmonium compound represented by the formula (2) is 1:2 to 2:1 (weight ratio), it is possible to obtain a near infrared absorption filter capable of absorbing a light of near infrared region in a good balance.

The diimmonium compound represented by the formula (2) may be used as a single compound or in admixture of two or more kinds of compounds. This compound is known to have a significantly reduced heat resistance when used in combination with other dyes; therefore, it has been necessary that when used in combination with other dyes, the compound and the other dye are contained separately in respective layers.

In the present invention, it is possible that at least one kind of other dithiol-nickel complex represented by the following formula (3):

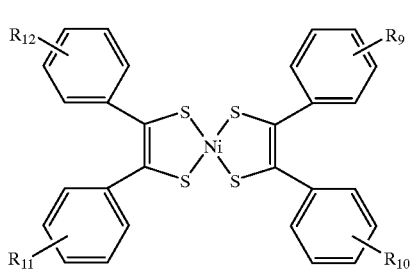

is used together with the dithiol-nickel complex represented by the formula (1) and the diimmonium compound represented by the formula (2), to reduce the use amount of the relatively expensive dithiol-nickel complex of formula (1) for cost reduction.

In the above formula (3), $R_9$ to $R_{12}$ may be the same or different and are each an alkylene group having 1 to 41 carbon atoms, an aryl group, an aralkyl group, an alkylamino group, an alkoxy group, a halogen atom or a hydrogen atom. Preferably, $R_9$ to $R_{12}$ may be the same or different and are each a hydrogen atom, an alkoxy group having 1–4 carbon atoms or dimethylamino group in view of availability.

Examples of the dithiol-nickel complex of formula (3) are as follows.

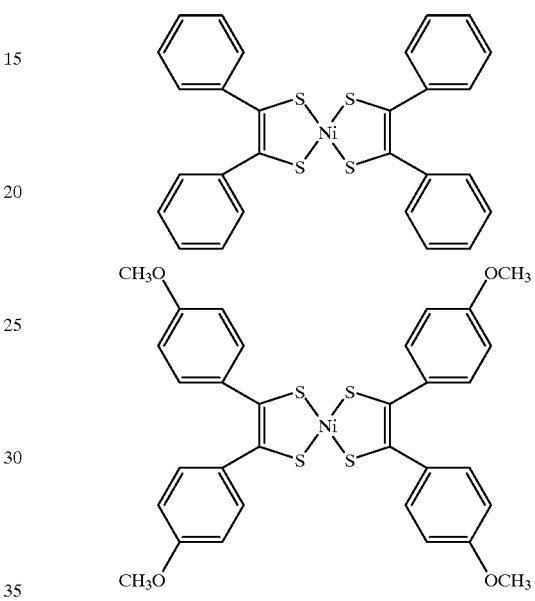

The amount of the dithiol-nickel complex of formula (3) added to the resin can be, for example, 1 to 800 mg (800 mg is close to the saturation concentration of the dithiol-nickel complex of formula (3) in the later-described solution used in production of the present near infrared absorption filter) per the unit area (i.e. 1 m$^2$) of the present near infrared absorption filter, preferably 5 to 500 mg per 1 m$^2$, more preferably 30 to 300 mg per 1 m$^2$.

When the amount of the dithiol-nickel complex of formula (3) added is smaller than the above range, no desired absorbance may be obtained. When the amount is too large, the transmittance for visible light may be low and insufficient. Therefore, none of such amounts is preferred.

As mentioned previously, the dithiol-nickel complex of formula (3) can replace part of the dithiol-nickel complex of formula (1). By controlling the compounding ratio of the dithiol-nickel complex of formula (1) and the dithiol-nickel complex of formula (3) at 1:4 to 4:1 (weight ratio) while the total amount of the two complexes is kept at the level mentioned for the use amount of the complex of formula (1), there can be obtained a near infrared absorption filter which can absorb a light of the near infrared region in good balance, which has increased absorbance for 800 to 900 nm, and which is lower in cost.

Production of the near infrared absorption filter of the present invention is conducted simply by adding a dithiol-nickel complex represented by the formula (1), at least one kind of diimmonium compound represented by the formula (2) and, as necessary, at least one kind of dithiol-nickel complex represented by the formula (3) to a polycarbonate, a polyarylate, or a mixture of the two polymers (the resulting mixture is then made into a film by solution casting); and there is no particular restriction as to the means for achieving it. Preferably, the above two or three components are dissolved in a solvent capable of dissolving the above polymer or polymer mixture, and then added to a solution of the polymer or polymer mixture.

The solvent can be any solvent as long as it can dissolve the polymer or polymer mixture. However, a chlorine-based solvent, an ether type solvent or a mixed solvent thereof is preferred. Examples of such a solvent are tetrahydrofuran (THF), diethyl ether, 1,4-dioxane, 1,3-dioxolane, chloroform, methylene chloride and a mixture of these solvents.

A specific example of the production process of the near infrared absorption filter of the present invention is described. To a solution of the above-mentioned polymer are added a solution of the dithiol-nickel complex represented by the formula (1), at least one kind of diimmonium compound represented by the formula (2) and, as necessary, at least one kind of dithiol-nickel complex represented by the formula (3); the resulting mixture is stirred until a uniform solution is obtained; the resulting solution is cast on an appropriate substrate such as a sheet, film or the like, by solution casting or the like, followed by drying.

For the solution casting, there can be used, a comma coater, a bar coater, a knife coater, a die coater, a doctor blade, etc. Alternatively, the solution may be coated on a transparent substrate or on a substrate having other function, to obtain the near infrared absorption filter of the present invention as a lamination type filter.

As to the thickness of the near infrared absorption filter of the present invention, there is no particular restriction as long as the filter contains near infrared-absorbing dyes in a total amount sufficient to show desired near infrared absorption and further shows a transmittance required for a practical filter. The thickness can be, for example, 1 to 300 μm, preferably 3 to 200 μm, more preferably 5 to 100 μm.

The thus-obtained near infrared absorption filter of the present invention has appropriate properties for use particularly as a near infrared filter for a plasma display panel, when combined with a layer having other functions such as reflection prevention, electromagnetic shielding, prevention of Newton's rings, antistatic property or the like.

The near infrared absorption filter of the present invention can further contain a near infrared-absorbing substance (e.g. at least one kind of a phthalocyanine type and/or naphthalocyanine type compound), an ultraviolet-absorbing substance, a plasticizer, a crosslinking agent, an antioxidant, a polymerization retarder, a dye, a pigment and/or a color-adjusting agent. The present near infrared absorption filter can be used as a color filter when it contains a dye, a pigment and/or a color-adjusting agent.

DESCRIPTION OF PREFERRED EMBODIMENTS

The present invention is described in more detail below by way of Examples.

EXAMPLE 1

In 100 parts by weight of chloroform were dissolved 10.2 parts by weight of a polycarbonate resin [Panlite L-1225 (trade name) produced by Teijin Chemicals Ltd.], 0.065 part by weight of a dithiol-nickel complex represented by the formula (1) and 0.095 part by weight of a diimmonium compound represented by the following formula:

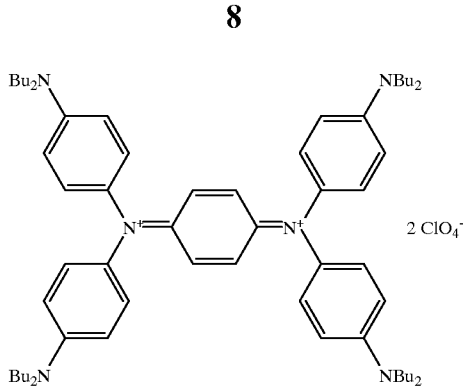

(this compound is referred to as the diimmonium compound [1] in the following Examples and Comparative Examples). The resulting solution was cast on a polyester film using a bar coater having gaps of 300 μm [Doctor Blade YD-7 (trade name) produced by Yoshimitsu Seiki K.K.] (the same bar coater was used in the following Examples and Comparative Examples) to form a film to be used as a near infrared absorption filter.

The film was subjected to a heat resistance test of 90° C. and 500 hours. The films before and after the heat resistance test were measured for respective absorption spectra, and the spectra are shown in FIG. 1. As is clear from FIG. 1, a near infrared region of 850 to 1,000 nm is shielded sufficiently and a visible light is transmitted sufficiently. Even after the 500-hour heat resistance test, there is substantially no decomposition of dyes and there is substantially no change in spectrum, and the film has high long-term heat resistance as a filter for a plasma display panel. Incidentally, in FIG. 1, the dotted curve is a spectrum after the 500-hour heat resistance test.

EXAMPLE 2

In 100 parts by weight of chloroform were dissolved 10.2 parts by weight of a polycarbonate resin [Panlite L-1225 (trade name) produced by Teijin Chemicals Ltd.], 0.065 part by weight of a dithiol-nickel complex represented by the formula (1) and 0.095 part by weight of a diimmonium compound represented by the following formula:

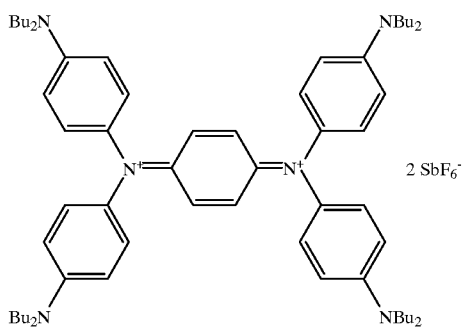

Figure 2:
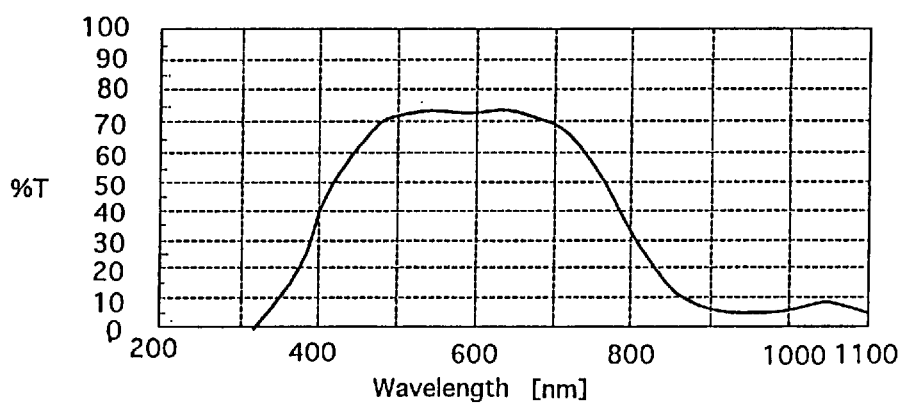
FIG. 2 is an absorption spectrum of the film (near infrared absorption filter) obtained in Example 2.

(this compound is referred to as the diimmonium compound [2] in the following Examples and Comparative Examples). The resulting solution was cast on a polyester film using a bar coater having gaps of 300 μm to form a film to be used as a near infrared absorption filter. The absorption spectrum of this film is shown in FIG. 2. As is clear from FIG. 2, a near infrared region of 850 to 1,000 nm is shielded sufficiently and a visible light is transmitted sufficiently.

EXAMPLE 3

In 100 parts by weight of chloroform were dissolved 10.0 parts by weight of a polycarbonate resin [Panlite C1400

(trade name) produced by Teijin Chemicals Ltd.], 0.015 part by weight of a dithiol-nickel complex represented by the formula (1), 0.06 part by weight of the diimmonium compound [2] and 0.03 part by weight of a dithiol-nickel complex represented by the following formula:

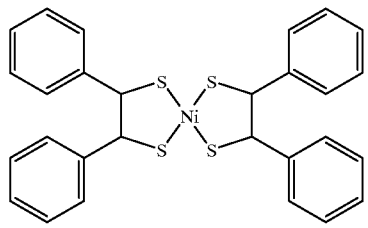

Figure 3:
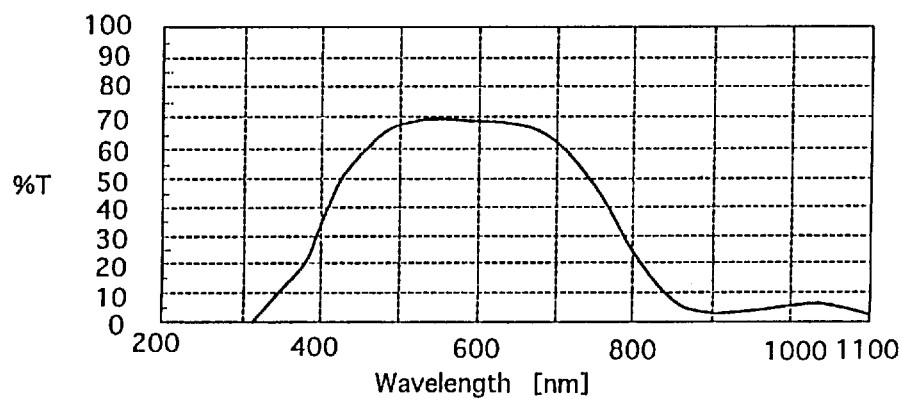
FIG. 3 is an absorption spectrum of the film (near infrared absorption filter) obtained in Example 3.

(this compound is referred to as the dithiol-nickel complex [1] in the following Examples and Comparative Examples). The resulting solution was cast on a polyester film using a bar coater having gaps of 300 μm to form a film to be used as a near infrared absorption filter. The absorption spectrum of this film is shown in FIG. 3. As is clear from FIG. 3, a near infrared region of 850 to 1,000 nm is shielded sufficiently and a visible light is transmitted sufficiently.

EXAMPLE 4

Figure 4:
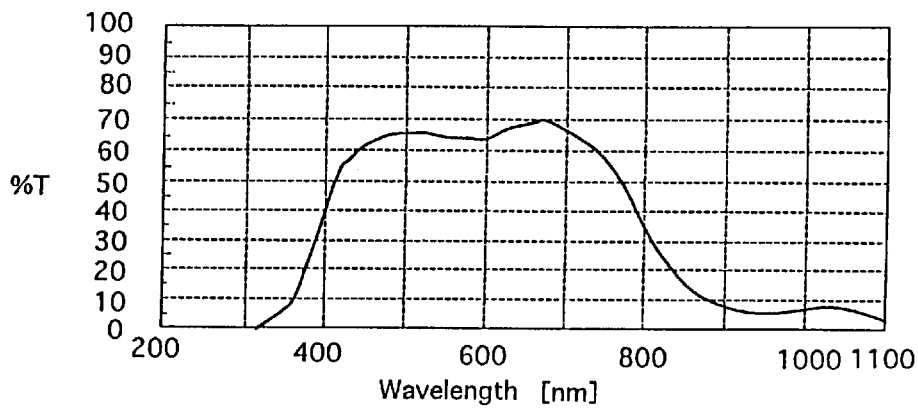
FIG. 4 is an absorption spectrum of the film (near infrared absorption filter) obtained in Example 4.

In 100 parts by weight of a mixed solvent (1,3-dioxolane/1,4-dioxane/tetrahydrofuran=40/40/30 [in volume]) were dissolved 23.4 parts by weight of a polycarbonate resin [Panlite L-1225 (trade name) produced by Teijin Chemicals Ltd.], 0.025 part by weight of a dithiol-nickel complex represented by the formula (1), 0.10 part by weight of the diimmonium compound [2], 0.06 part by weight of the dithiol-nickel complex [1], 0.01 part by weight of a color-adjusting agent [Kaya Violet AR (trade name) produced by Nippon Kayaku Co., Ltd.] and 0.003 part by weight of another color-adjusting agent [Kaya Blue N (trade name) produced by Nippon Kayaku Co., Ltd.]. The resulting solution was cast on a polyester film using a bar coater having gaps of 300 μm to form a film to be used as a near infrared absorption filter. The film had a gray color which was preferable for a filter for a plasma display panel. The absorption spectrum of this film is shown in FIG. 4. As is clear from FIG. 4, a near infrared region of 850 to 1,000 nm is shielded sufficiently and a visible light is transmitted sufficiently.

EXAMPLE 5

Figure 5:
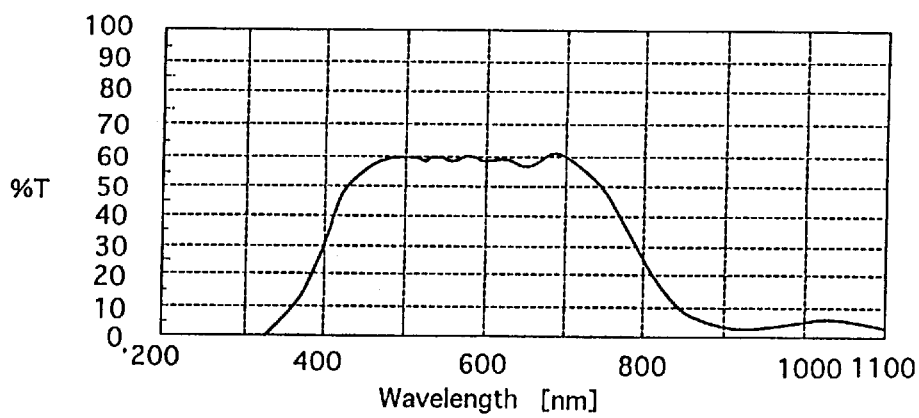
FIG. 5 is an absorption spectrum of the film (near infrared absorption filter) obtained in Example 5.

In 100 parts by weight of 1,3-dioxolane were dissolved 16.0 parts by weight of a polycarbonate resin [Panlite L-1225 (trade name) produced by Teijin Chemicals Ltd.], 0.025 part by weight of a dithiol-nickel complex represented by the formula (1), 0.10 part by weight of the diimmonium compound [1], 0.06 part by weight of the dithiol-nickel complex [1], 0.007 part by weight of a color-adjusting agent [Kaya Red B (trade name) produced by Nippon Kayaku Co., Ltd.] and 0.007 part by weight of another color-adjusting agent [Kaya Blue N (trade name) produced by Nippon Kayaku Co., Ltd.]. The resulting solution was cast on a polyester film using a bar coater having gaps of 300 μm to form a film to be used as a near infrared absorption filter. The film had a gray color which was preferable for a filter for a plasma display panel. The absorption spectrum of this film is shown in FIG. 5. As is clear from FIG. 5, a near infrared region of 850 to 1,000 nm is shielded sufficiently and a visible light is transmitted sufficiently.

EXAMPLE 6

Figure 6:
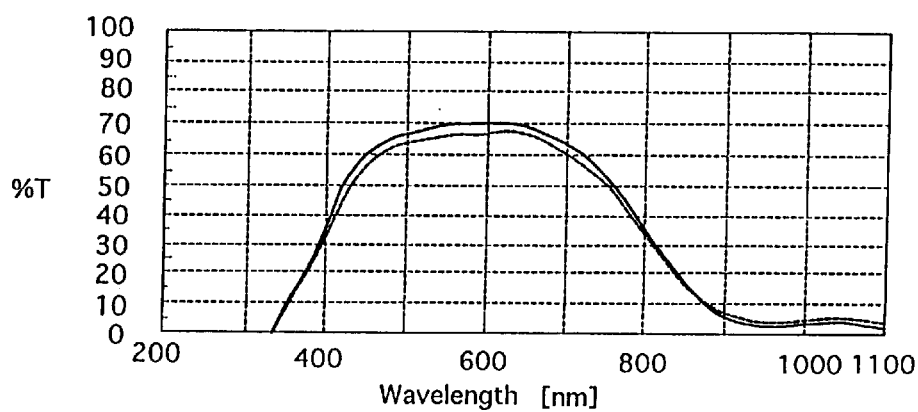
FIG. 6 is an absorption spectrum of the film (near infrared absorption filter) obtained in Example 6.

In 100 parts by weight of chloroform were dissolved 16.7 parts by weight of a polyarylate resin [D Powder (trade name) produced by Unitika Ltd.], 0.07 part by weight; of a dithiol-nickel complex represented by the formula (1) and 0.09 part by weight of the diimmonium compound [2]. The resulting solution was cast on a polyester film using a bar coater having gaps of 300 μm to form a film to be used as a near infrared absorption filter. The absorption spectrum of this film is shown in FIG. 6. As is clear from FIG. 6, a near infrared region of 850 to 1,000 nm is shielded sufficiently and a visible light is transmitted sufficiently. Even after the 500-hour heat resistance test, there is substantially no decomposition of dyes and there is substantially no change in spectrum, and the film has high long-term heat resistance as a filter for a plasma display panel. Incidentally, in FIG. 6, the dotted curve is a spectrum after the 500-hour heat resistance test.

EXAMPLE 7

Figure 7:
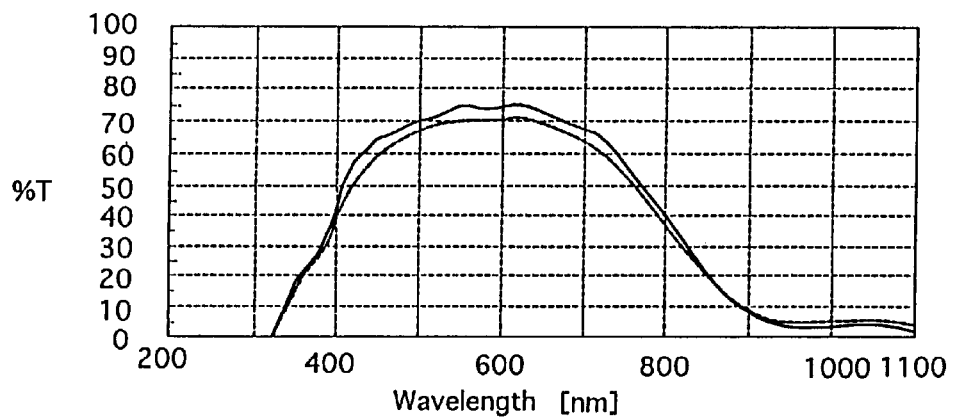
FIG. 7 is an absorption spectrum of the film (near infrared absorption filter) obtained in Example 7.

In 100 parts by weight of chloroform were dissolved 16.7 parts by weight of a polyarylate-polycarbonate (1:1) alloy resin [P-5001 (trade name) produced by Unitika Ltd.], 0.05 part by weight of a dithiol-nickel complex represented by the formula (1) and 0.09 part by weight of the diimmonium compound [2]. The resulting solution was cast on a polyester film using a bar coater having gaps of 300 μm to form a film to be used as a near infrared absorption filter. The absorption spectrum of this film is shown in FIG. 7. As is clear from FIG. 7, a near infrared region of 850 to 1,000 nm is shielded sufficiently and a visible light is transmitted sufficiently. Even after the 500-hour heat resistance test, there is substantially no decomposition of dyes and there is substantially no change in spectrum, and the film has high long-term heat resistance as a filter for a plasma display panel. Incidentally, in FIG. 7, the dotted curve is a spectrum after the 500-hour heat resistance test.

COMPARATIVE EXAMPLE 1

Figure 8:
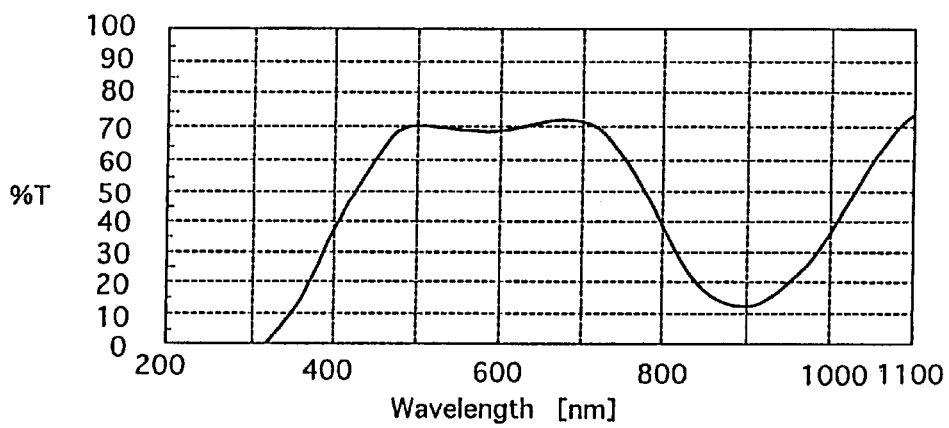
FIG. 8 is an absorption spectrum of the film (near infrared absorption filter) obtained in Comparative Example 1.

In 100 parts by weight of chloroform were dissolved 10.2 parts by weight of a polycarbonate resin [Panlite L-1250Z (trade name) produced by Teijin Chemicals Ltd.] and 0.065 part by weight of a dithiol-nickel complex represented by the formula (1). The resulting solution was cast on a polyester film using a bar coater having gaps of 300 μm to form a film to be used as a near infrared absorption filter. The absorption spectrum of this film is shown in FIG. 8. As is clear from FIG. 8, the absorption of 900 to 1000 nm is weak.

COMPARATIVE EXAMPLE 2

Figure 9:
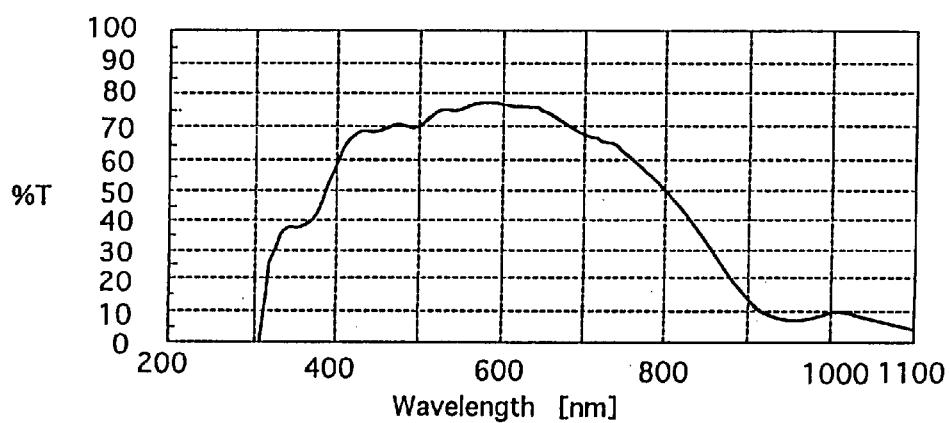
FIG. 9 is an absorption spectrum of the film (near infrared absorption filter) obtained in Comparative Example 2.

In 100 parts by weight of chloroform were dissolved 10.2 parts by weight of a polycarbonate resin [Panlite L-1250Z (trade name) produced by Teijin Chemicals Ltd.] and 0.095 part by weight of the diimmonium compound [1]. The resulting solution was cast on a polyester film using a bar coater having gaps of 300 μm form a film to be used as a near infrared absorption filter. The absorption spectrum of this film is shown in FIG. 9. As is clear from FIG. 9, the absorption of 850 to 900 nm is weak.

COMPARATIVE EXAMPLE 3

Figure 10:
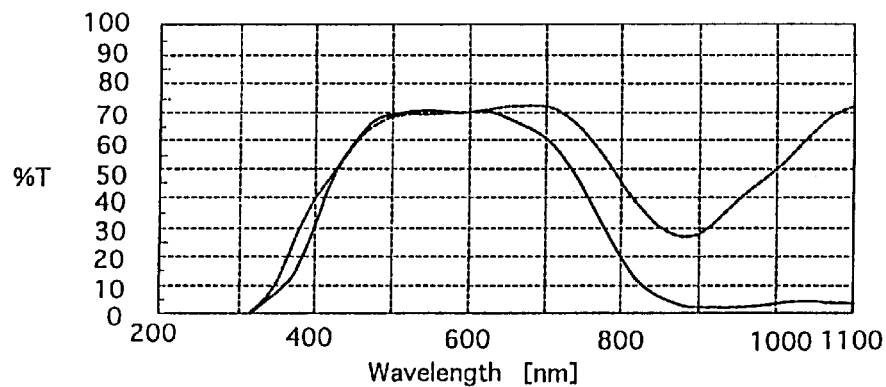
FIG. 10 is an absorption spectrum of the film (near infrared absorption filter) obtained in Comparative Example 3.

In 100 parts by weight of chloroform were dissolved 10.2 parts by weight of an acrylic resin [Acrypet (trade name) produced by Mitsubishi Rayon Co., Ltd.], 0.065 part by weight of a dithiol-nickel complex represented by the formula (1) and 0.095 part by weight of the diimmonium compound [1]. The resulting solution was cast on a polyester film using a bar coater having gaps of 300 μm to form a film to be used as a near infrared absorption filter. The film was subjected to a heat resistance test of 90° C. and 500 hours. The absorption spectra of the films before and after the heat resistance test are shown in FIG. 10. As is clear from Table 10, after the 500-hour heat resistance test, the absorption of particularly 900 nm or larger is weak owing to the decomposition of dyes. Incidentally, in FIG. 10, the dotted curve is a spectrum after the 500-hour heat resistance test.

EXAMPLE 8

Figure 11:
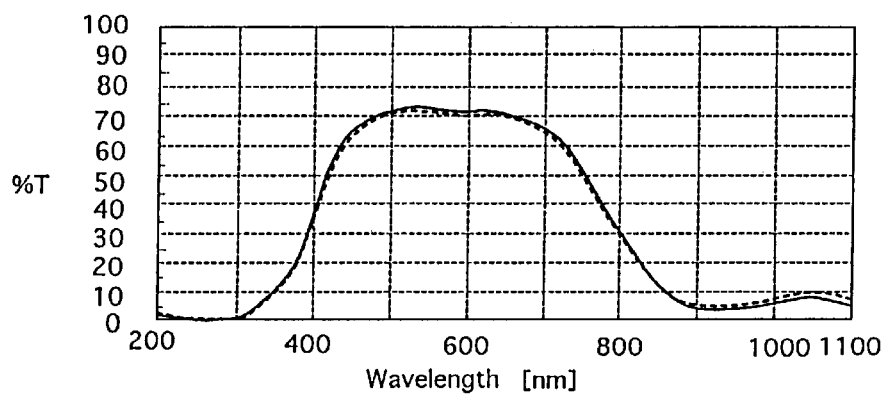
FIG. 11 is an absorption spectrum of the film (near infrared absorption filter) obtained in Example 8.

In 250 parts by weight of 1,3-dioxolane were dissolved 32.0 parts by weight of a polycarbonate resin [Panlite L-1250Z (trade name) produced by Teijin Chemicals Ltd.], 0.47 part by weight of a dithiol-nickel complex represented by the formula (1), 0.53 part by weight of the diimmonium compound [1] and 0.25 part by weight of a phthalocyanine type compound (a near infrared-absorbing substance) [TX-EX 812K (trade name) produced by Nippon Shokubai Co., Ltd.]. The resulting solution was cast on a polyester film using a bar coater having gaps of 100 μm to form a film to be used as a near infrared absorption filter. The film was subjected to a heat resistance test of 90° C. and 500 hours. The absorption spectrum of this film is shown in FIG. 11. As is clear from FIG. 11, a near infrared region of 850 to 1,000 nm is shielded sufficiently and a visible light is transmitted sufficiently. Even after the 500-hour heat resistance test, there is substantially no decomposition of dyes and there is substantially no change in spectrum, and the film has high long-term heat resistance as a filter for a plasma display panel. Incidentally, in FIG. 11, the dotted curve is a spectrum after the 500-hour heat resistance test.

EXAMPLE 9

Figure 12:
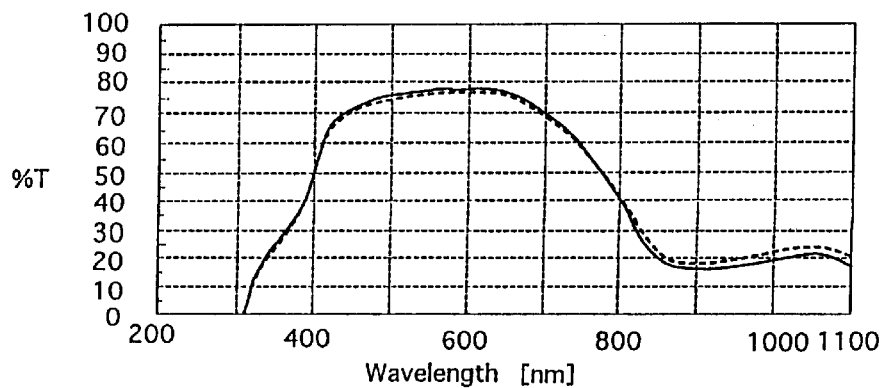
FIG. 12 is an absorption spectrum of the film (near infrared absorption filter) obtained in Example 9.

In 250 parts by weight of 1,3-dioxolane were dissolved 32.0 parts by weight of a polycarbonate resin [Panlite L-1250Z (trade name) produced by Teijin Chemicals Ltd.], 0.13 part by weight of a dithiol-nickel complex represented by the formula (1), 0.34 part by weight of the dithiol-nickel complex [1], 0.53 part by weight of the diimmonium compound [2] and 0.25 part by weight of a phthalocyanine type compound (a near infrared-absorbing substance) [TX-EX 801B (trade name) produced by Nippon Shokubai Co., Ltd.]. The resulting solution was cast on a polyester film using a bar coater having gaps of 100 μm to form a film to be used as a near infrared absorption filter. The film was subjected to a heat resistance test of 90° C. and 500 hours. The absorption spectrum of this film is shown in FIG. 12. As is clear from FIG. 12, a near infrared region of 850 to 1,000 nm is shielded sufficiently and a visible light is transmitted sufficiently. Even after the 500-hour heat resistance test, there is substantially no decomposition of dyes and there is substantially no change in spectrum, and the film has high long-term heat resistance as a filter for a plasma display panel. Incidentally, in FIG. 12, the dotted curve is a spectrum after the 500-hour heat resistance test.

EXAMPLE 10

Figure 13:
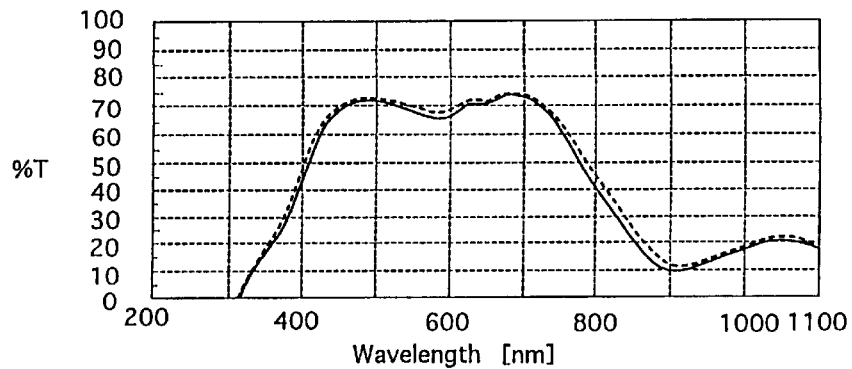
FIG. 13 is an absorption spectrum of the film (near infrared absorption filter) obtained in Example 10.

In 300 parts by weight of 1,3-dioxolane were dissolved 36.0 parts by weight of a polycarbonate resin [Panlite L-1250Z (trade name) produced by Teijin Chemicals Ltd.], 0.5 part by weight of a dithiol-nickel complex represented by the formula (1), 0.5 part by weight of the diimmonium compound [2], 0.25 part by weight of a phthalocyanine type compound (a near infrared-absorbing substance) [TX-EX 812K (trade name) produced by Nippon Shokubai Co., Ltd.], 0.083 part by weight of a color-adjusting agent [Kaya violet AR (trade name) produced by Nippon Kayaku Co., Ltd.] and 0.025 part by weight of another color-adjusting agent [Kaya Blue N (trade name) produced by Nippon Kayaku Co., Ltd.]. The resulting solution was cast on a polyester film using a bar coater having gaps of 150 μm to form a film to be used as a near infrared absorption filter. The film had a gray color which was preferable for a filter for a plasma display panel. The film was subjected to a heat resistance test of 90° C. and 500 hours. The absorption spectrum of this film is shown in FIG. 13. As is clear from FIG. 13, a near infrared region of 850 to 1,000 nm is shielded sufficiently and a visible light is transmitted sufficiently. Even after the 500-hour heat resistance test, there is substantially no decomposition of dyes and there is substantially no change in spectrum, and the film has high long-term heat resistance as a filter for a plasma display panel. Incidentally, in FIG. 13, the dotted curve is a spectrum after the 500-hour heat resistance test.

EXAMPLE 11

Figure 14:
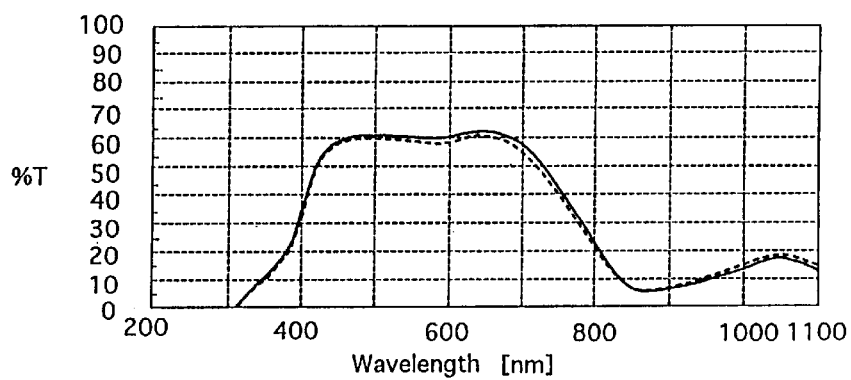
FIG. 14 is an absorption spectrum of the film (near infrared absorption filter) obtained in Example 11.

In 300 parts by weight of 1,3-dioxolane were dissolved 36.0 parts by weight of a polycarbonate resin [Panlite L-1250Z (trade name) produced by Teijin Chemicals Ltd.], 0.13 part by weight of a dithiol-nickel complex represented by the formula (1), 0.34 part by weight of a dithiol-nickel complex [IR additive 2000 (trade name) produced by Dainippon Ink & Chemicals Inc.], 0.53 part by weight of the diimmonium compound [2], 0.25 part by weight of a phthalocyanine type compound (a near infrared-absorbing substance) [TX-EX 801B (trade name) produced by Nippon Shokubai Co., Ltd.], 0.083 part by weight of a color-adjusting agent [Kaya violet AR (trade name) produced by Nippon Kayaku Co., Ltd.] and 0.025 part by weight of another color-adjusting agent [Kaya Blue N (trade name) produced by Nippon Kayeiku Co., Ltd.]. The resulting solution was cast on a polyester film using a bar coater having gaps of 150 μm to form a film to be used as a near infrared absorption filter. The film had a gray color which was preferable for a filter for a plasma display panel. The film was subjected to a heat resistance test, of 90° C. and 500 hours. The absorption spectrum of this film is shown in FIG. 14. As is clear from FIG. 14, a near infrared region of 850 to 1,000 nm is shielded sufficiently and a visible light is transmitted sufficiently. Even after the 500-hour heat resistance test, there is substantially no decomposition of dyes and there is substantially no change in spectrum, and the film has high long-term heat resistance as a filter for a plasma display panel. Incidentally, in FIG. 14, the dotted curve is a spectrum after the 500-hour heat resistance test.

EXAMPLE 12

Figure 15:
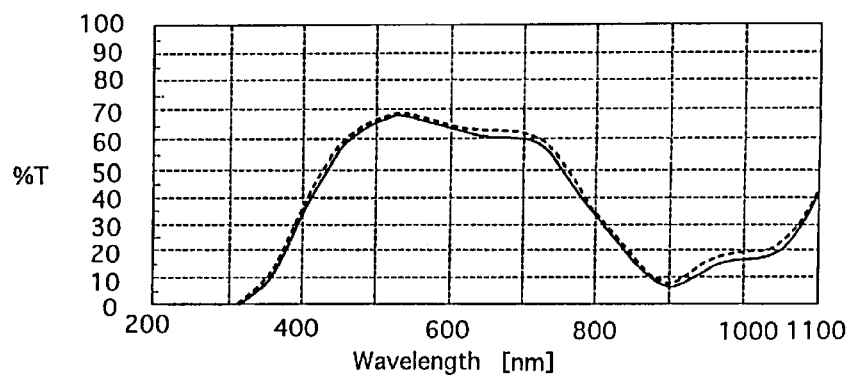
FIG. 15 is an absorption spectrum of the film (near infrared absorption filter) obtained in Example 12.

In 270 parts by weight of 1,3-dioxolane were dissolved 36.0 parts by weight of a polycarbonate resin [Parlite L-1250Z (trade name) produced by Teijin Chemicals Ltd.], 0.6 part by weight of a dithiol-nickel complex represented by the formula (1), 0.3 part by weight of a phthalocyanine type compound (a near infrared-absorbing substance) [TX-EX 812K (trade name) produced by Nippon Shokubai Co., Ltd.] and 0.4 part by weight of phthalocyanine type compound (a near infrared-absorbing substance) [TX-EX 903B (trade name) produced by Nippon Shokubai Co., Ltd.]. The resulting solution was cast on a polyester film using a bar coater having gaps of 150 μm to form a film to be used as a near infrared absorption filter. The film was subjected to a heat resistance test of 90° C. and 500 hours. The absorption spectrum of this film is shown in FIG. 15. As is clear from FIG. 15, a near infrared region of 850 to 1,000 nm is shielded sufficiently and a visible light is transmitted sufficiently. Even after the 500-hour heat resistance test, there is substantially no decomposition of dyes and there is substantially no change in spectrum, and the film has high long-term heat resistance as a filter for a plasma display panel. Incidentally, in FIG. 15, the dotted curve is a spectrum after the 500-hour heat resistance test.

As described above, the near infrared absorption filter of the present invention contains a particular dithiol-nickel complex and a particular diimmonium compound in a resin film produced from either or both of a polycarbonate and a polyarylate by solution casting; thereby, the present filter alleviates the problem of a diimmonium compound that the heat resistance of the compound decreases significantly when used together with another dye, and shows stable absorption over a long period of time even at high temperatures.

Further, the present near infrared absorption filter has a high transmittance for visible light and high absorbance for the near infrared region (850 to 1,000 nm) owing to the combined use of a particular dithiol-nickel complex and a particular diimmonium compound (the complex and the compound can be present in the same layer and need not be present in respective layers), and can be suitably used particularly as a near infrared filter for a plasma display panel.

What is claimed is:

1. A near infrared absorption filter which contains, in a resin film produced from either or both of a polycarbonate and a polyarylate by solution casting, a dithiol-nickel complex represented by the following formula (1):

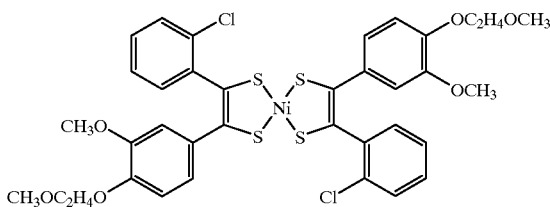

(1)

and at least one kind of diimmonium compound represented by the following formula (2):

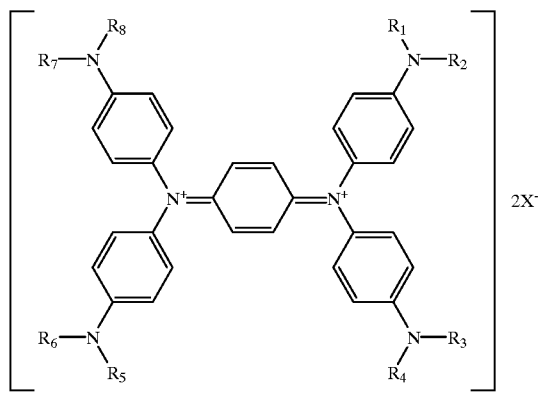

(2)

wherein $R_1$ to $R_8$ may be the same or different and are each a hydrogen atom, an alkyl group or an aryl group; and X– is an anion represented by halogen anion, perchloric acid anion, antimony hexafluoride anion or nitric acid anion.

2. A near infrared absorption filter according to claim 1, which further contains at least one kind of dithiol-nickel complex represented by the following formula (3):

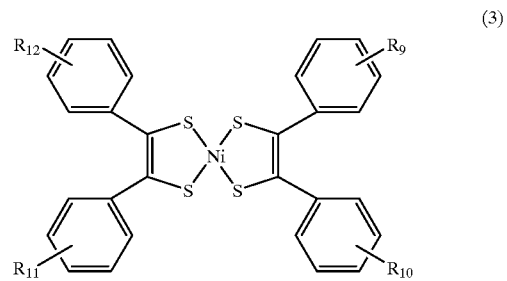

(3)

wherein $R_9$ to $R_{12}$ may be the same or different and are each an alkylene group having 1 to 4 carbon atoms, an aryl group, an aralkyl group, an alkylamino group, an alkoxy group, a halogen atom or a hydrogen atom.

3. A near infrared absorption filter according to claim 1, which further contains at least one kind of a phthalocyanine and/or naphthalocyanine compound.

4. A near infrared absorption filter for plasma display panel which uses a near infrared absorption filter set forth in claim 1.

5. A near infrared absorption filter according to claim 2, which further contains at least one kind of a phthalocyanine type and/or napththalocyanine type compound.

6. A near infrared absorption filter for plasma display panel which uses a near infrared absorption filter set forth in claim 2.

7. A near infrared absorption filter for plasma display panel which uses a near infrared absorption filter set forth in claim 3.

8. A near infrared absorption filter for plasma display panel which uses a near infrared absorption filter set forth in claim 5.

* * * * *